US005087923A

United States Patent [19]

Bruch

[11] Patent Number: 5,087,923

[45] Date of Patent: Feb. 11, 1992

[54] METHOD OF ADJUSTING A STROBE PULSE FOR A THERMAL LINE ARRAY PRINTER

[75] Inventor: Thomas P. Bruch, McMinnville, Oreg.

[73] Assignee: Hewlett-Packard Company, Palo Alto, Calif.

[21] Appl. No.: 529,013

[22] Filed: May 25, 1990

[51] Int. Cl.[5] .................... G01D 9/00; G01D 15/10

[52] U.S. Cl. .......................... 346/1.1; 346/76 PH

[58] Field of Search ............... 346/76 PH, 1.1, 107 R; 307/234, 350, 351, 354; 328/114, 132; 364/571.01, 571.02, 571.03

[56] References Cited

U.S. PATENT DOCUMENTS

| | | | |
|---|---|---|---|
| 4,113,391 | 9/1978 | Minowa | 400/120 |
| 4,168,421 | 9/1979 | Ito | 219/216 |
| 4,663,734 | 5/1987 | Berry | 346/76 PH |
| 4,873,536 | 10/1989 | Minowa et al. | 346/76 PH |

*Primary Examiner*—Benjamin R. Fuller

*Assistant Examiner*—David Yockey

[57] ABSTRACT

A method of providing an appropriate strobe pulse width for a print head element in a thermal printer wherein a look-up table is created for determining target strobe pulse durations. These durations are computed functions of power supply voltage levels, measured in real time, print head element temperatures, measured previously, and average element resistance, also measured previously. Once such a table is established, strobe pulses are initiated for driving current through print head dot elements. Periodically the power supply voltage levels in the print head are measured and the values temporarily stored. The look-up table is consulted to obtain a target strobe pulse width which is compared to the elapsed time of the strobe. The strobe pulse is continued so long as the latest target pulse width exceeds the width or elapsed time of the strobe pulse. The strobe pulse is terminated when the latest target pulse width has been equaled or exceeded by the elapsed time of the strobe pulse.

10 Claims, 2 Drawing Sheets

METHOD OF ADJUSTING A STROBE PULSE FOR A THERMAL LINE ARRAY PRINTER

DESCRIPTION

1. Technical Field

The invention relates to thermal printers having printing elements driven by strobe pulses whose power may be adjusted. In particular, the invention relates to a method of adjusting power to such a printing element.

2. Background Art

In U.S. Pat. No. 4,113,391, M. Minowa discloses a method for controlling the pulse width of strobe pulses applied to printing elements of a thermal printer. The system of Minowa is of the feedback type where a decrease in the print head element output voltage is measured and the width of a strobe pulse is correspondingly increased. Conversely, the pulse width is decreased in response to increases in the output voltage. In U.S. Pat. No. 4,168,421, Y. Ito discloses a similar system using different circuit elements.

The prior art recognized that factors such as print element resistance, temperature and current level can affect print quality. Generally, the control mechanisms adapted to achieve a desired print quality involved simple models. For example, in the aforementioned patents, when voltage of the print element power supply dropped, the pulse width was increased and vice versa. Such models were quite useful, but did not take into account other factors which might cause the model to become nonlinear. For example, printing speed and history level were not taken into account. The latter parameter is associated with applications for multiple strobes or line passes, and is used to achieve the desired dot contrast relative to a print medium.

An object of the invention was to more accurately control the power delivered to a printing element by taking into account nonlinear quantities such as printing speed and history level, in establishing strobe pulse duration.

SUMMARY OF THE INVENTION

The above object has been achieved in a printing method wherein print head pulse width is varied in accord with data derived from a look-up table. A predictive model of print element behavior is employed where the model relates speed, history level as well as voltage, temperature and resistance to strobe pulse duration. In accord with the present invention a semiconductor memory forms a look-up table for storing desired or target strobe pulse durations computed from various power supply voltage levels, taking into account parameters mentioned above.

Once the relationships are stored, a strobe pulse may be initiated at a print head element. Once the pulse is initiated, periodic real time measurements are made of power supply voltage levels. Reference is made to the look-up table to obtain the target pulse width value using the real time measurement. The actual strobe pulse is continued so long as the target pulse width has not been exceeded. Continued measurements of the power supply level are made and further look-up values are found. Each time a new pulse width is obtained from the table, a comparison must be made to see whether the actual elapsed time exceeds the target value. Once the target value is equaled or exceeded, the strobe pulse is terminated.

This procedure is repeated each time the thermal line array is turned on. The thermal line array may be turned on multiple times per scan line in order to adjust the energy applied to individual dot elements based on the amount of preheating they have experienced in previous scan lines. Each of these multiple strobes is assigned a history level which points to a section of the strobe width look-up table.

BEST MODE FOR CARRYING OUT THE INVENTION

In thermal printing, it is desirable to obtain consistent print quality with minimal power consumption over a wide range of operating conditions. In accord with the present invention, a look-up table is created giving values for a target strobe width which depends upon power supply voltage, average resistance and print head element temperature. This equation is expressed as $$W = V \times R \times T$$

where W is the strobe width, V is a voltage function, R is a resistance function and T is a temperature function. The voltage function V is described by the following equation:

$$V = \frac{K0 - (K1 \times V)}{V^2}$$

where K0 and K1 are empirical constants which are dependent on print speed and history level. The constants are assigned to each speed and to each history level, the history level relating to previously observed print characteristics whereby a desired level of contrast can be obtained. The voltage, V, is the measured power supply voltage and is the only quantity measured in real time. All other quantities are previously measured so that different strobe pulse widths are available for different previously measured functions.

The resistance of function R is given by the following formula:

$$R = \frac{(R_A + R_D)^2}{R_A}$$

where $R_A$ is the average element resistance and $R_D$ is the resistance of the element driver so that $R_A$ plus $R_D$ are equal to the total resistance in the print head element circuit.

The temperature function is given by the following equation:

$$T = 1.0 + ((25.0 - T_p) \times 0.007)$$

where $T_p$ is equal to print head temperature in degrees Celsius. The temperature function is supplied by the print element manufacturer.

Figure 1:
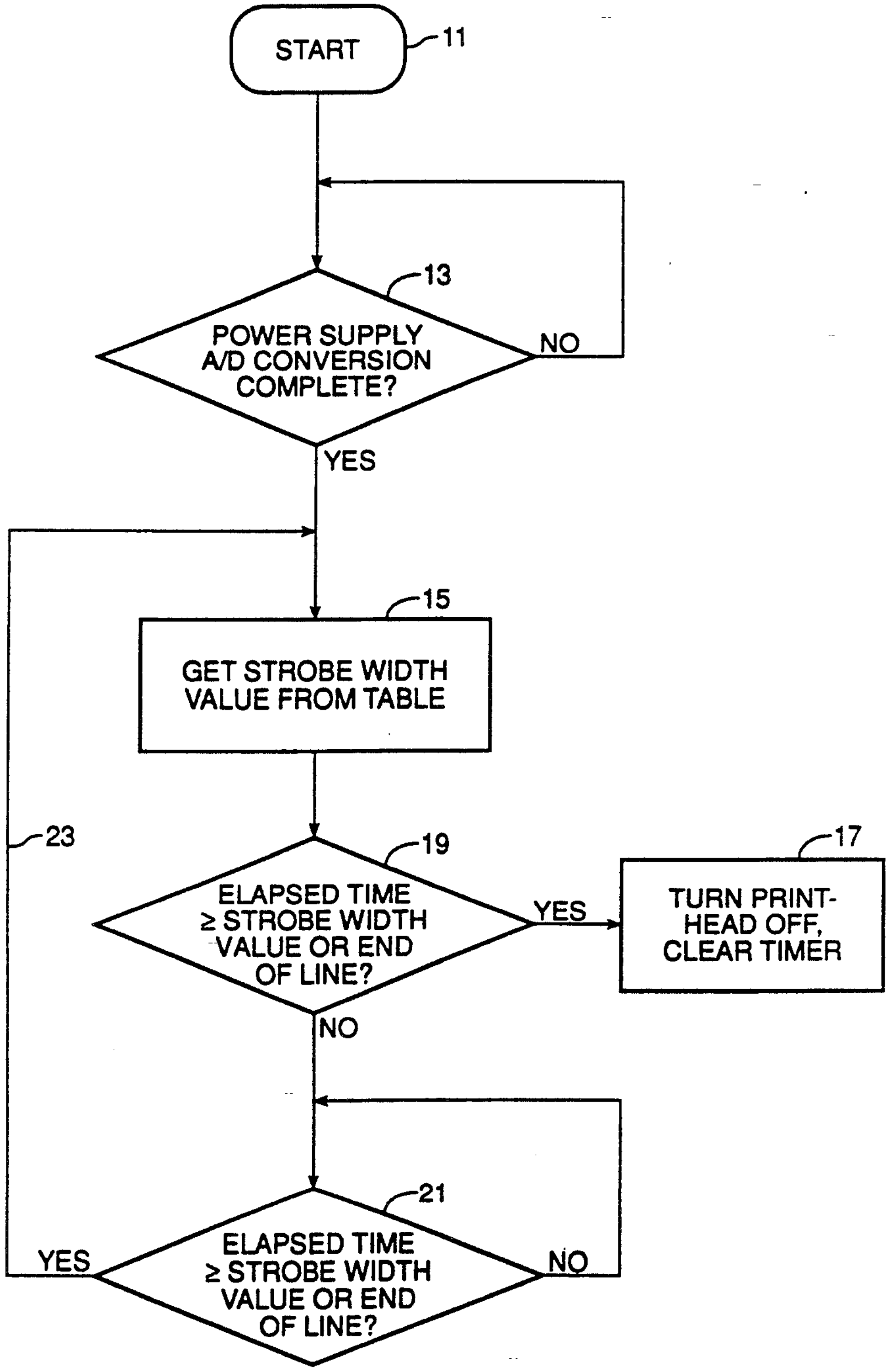
FIG. 1 is a flow diagram showing steps for establishing strobe pulse width in accord with the invention.

With reference to FIG. 1, a print head strobe pulse is initiated at block 11. Shortly thereafter, power supply voltage is measured, as indicated by block 13. The supply measurement is converted to digital form and then the target strobe width is obtained from the look-up table, indicated by block 15. The target pulse width obtained from the table is compared to the actual elapsed time since the initiation of the strobe pulse. When the actual elapsed time is equal to or exceeds the target strobe the print head element is turned off, indicated by block 17 with the comparison indicated by block 19. If the measured strobe pulse width does not exceed the target width, as indicated by block 21, the strobe width is extended and new comparisons are made after obtaining further power supply voltage level measurements, indicated by line 23. The entire process is repeated until the pulse width of the strobe exceeds the target width from the table. As previously mentioned, the print head is then turned off, indicated by block 17.

Figure 2A:
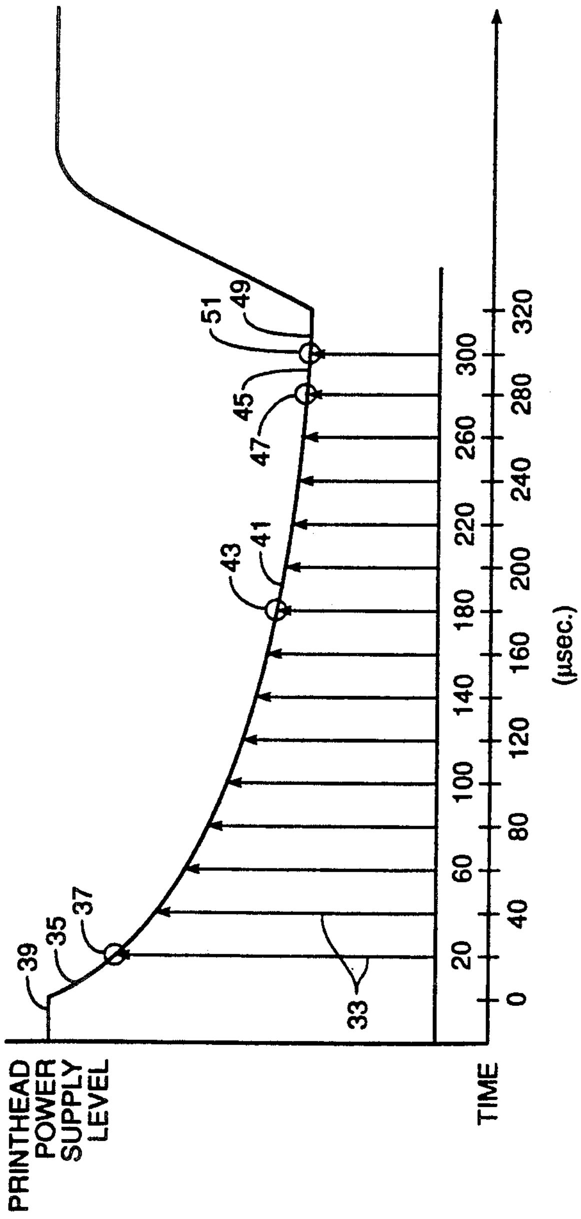
FIGS. 2 and 2a are timing diagrams showing strobe width in comparison to print head power supply levels for different elapsed times.
Figure 2:
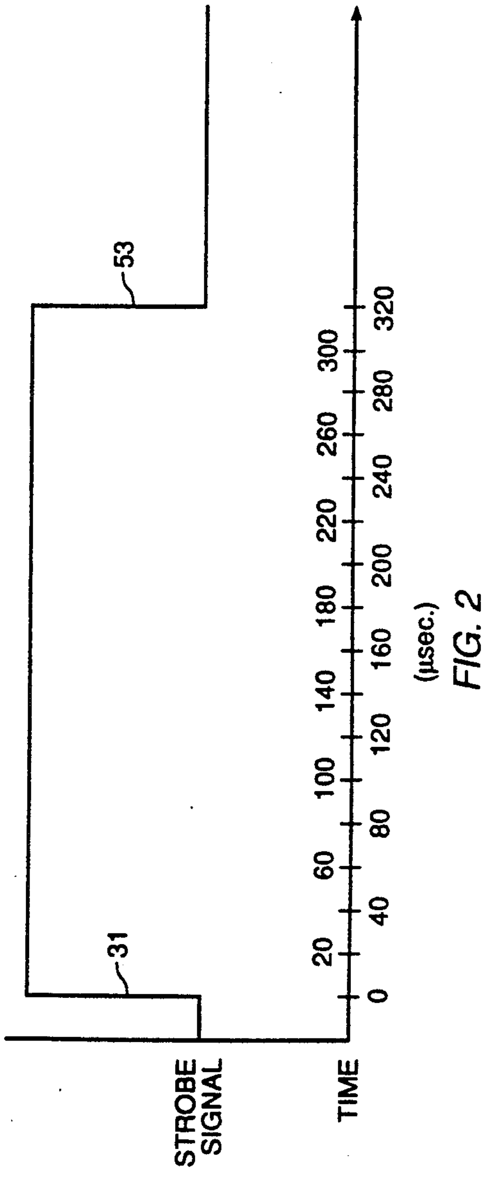

With reference to FIGS. 2 and 2a, elapsed time of a strobe pulse width is shown in micro seconds. A time equals 0, the strobe pulse is initiated, indicated by the vertical line 31. Shortly after the strobe pulse is initiated, periodic measurements of the print head power supply level are made, indicated by the vertical lines 33 in the upper plot. The actual print head power supply level is indicated by the curve 35. At the first measurement interval, indicated by the circle 37, a voltage measurement is made. The value found is below the upper level 39, existing at the initiation of the strobe pulse. The look-up table is consulted for the voltage level found within the circle 37 and a number is obtained from the table, corresponding to a target pulse width for this particular voltage. Assume that the target value is 190 microseconds. Since at the measurement time, only about 20 microseconds have elapsed, the strobe pulse is continued.

Other voltage levels may be read, indicated by the vertical lines parallel to 33, but a new reading is not necessary until the elapsed time matches the target value at 190 microseconds, indicated by point 41 on the voltage curve 35. At this point, the previously measured voltage level is read, indicated by circle 43. The look-up table is consulted for a new target pulse width value. Assume the value is 290 microseconds. The strobe pulse width is again extended and the next reading of the measured voltage level occurs when 290 microseconds have elapsed, approximately at point 45 on curve 35. The last measured voltage level of the strobe is read, indicated by the circle 47. The look-up table is consulted for this level and we may assume that the reading is 310 microseconds. At 310 microseconds of actual time, indicated at point 49, the power supply voltage level is read, indicated by circle 51 and a target strobe pulse length of 310 microseconds is found which has now been exceeded by the actual elapsed time. Accordingly, the strobe pulse is terminated, indicated by vertical line 53.

In the above description, single samples of the measured print head power supply voltage level were used in consulting the look-up table. As an alternative, average values relative to the start of the measurement may be made for an even more accurate determination. Values for the look-up table may be stored on a floppy disk and loaded into semiconductor volatile memory before printing or may be stored in a non-volatile memory. The look-up table permits complex and precise modeling of strobe duration as a function of various operating conditions. Good strobe pulse width compensation is particularly important in high speed, battery powered thermal printers, such as those used in battery powered facsimile machines, cardiographs and field data logging equipment.

In the above description, history level was used to adjust the energy applied to individual dot elements based on their recent history in order to obtain consistent contrast and eliminate tailing. History level could also be used to vary the contrast of individual dots in order to create gray-scale images.

What is claimed is:

1. A method of adjusting a strobe pulse width of a print head element comprising the steps of, (a) establishing a look-up table in a memory array having print element target pulse width information based on a plurality of parameters, (b) commencing a strobe pulse of a minimum target pulse width for a print head element, (c) measuring at least one of said parameters during the strobe pulse, (d) obtaining an adjusted target pulse width from the look-up table by locating the target pulse width upon which said at least one of said parameters measured in step (c) is based, (e) extending the strobe pulse for a length equal to whichever is longer of the minimum pulse width and the adjusted pulse width, (f) repeating steps (c)-(e), and (g) terminating the strobe pulse when the pulse width as determined from said commencing of the strobe pulse has been equaled or exceeded by said length of said minimum target pulse width and said adjusted pulse width.

2. The method of claim 1 wherein one of said plurality of parameters is average print head element resistance.

3. The method of claim 1 wherein one of said plurality of parameters is print head temperature.

4. The method of claim 1 wherein one of said plurality of parameters is print speed.

5. The method of claim 1 wherein one of said plurality of parameters is history level.

6. A method for establishing a duration of a strobe pulse for a thermal print head element in a multi-element print head comprising the steps of, (a) storing in a look-up table values related to target strobe pulse durations for computed functions of power supply voltage level and one of the following: print head element temperature and average element resistance, (b) commencing a strobe pulse of a first target duration for a print head element, (c) periodically measuring the power supply voltage level of the strobe pulse during the strobe pulse, (d) obtaining adjusted target durations by periodically referring to the look-up table for the pulse durations associated with power supply voltage levels measured in step (c), (e) continuing the strobe pulse so long as an adjusted target duration obtained in step (d) exceeds a duration of the strobe pulse at a time said adjusted target duration is obtained, and (f) terminating the strobe pulse when an adjusted target duration obtained in step (d) has been equaled or exceeded by a duration of the strobe pulse at the time said adjusted target duration is obtained.

7. The method of claim 6 further comprising the step of determining stored look-up table values from previously measured print head element average resistance and temperature.

8. The method of claim 6 wherein the first target duration is a product of functions of measured power supply voltage, average element resistance and temperature for each print speed and history level.

9. A method for establishing a duration of a strobe pulse for a thermal print head element in a multi-element print head comprising the steps of, (a) storing in a look-up table values of target strobe pulse durations for computed functions of power supply voltage levels, print head temperature, average element resistance, paper speed, and history level, (b) commencing a strobe pulse of a first target pulse width for a print head element, (c) periodically measuring a power supply voltage level of the strobe pulse and computing an average power supply voltage level relative to the commencing of the strobe pulse, (d) obtaining adjusted target pulse widths by periodically reading the look-up table locations pointed to by the average power supply voltage level measured in step (c), (e) continuing the strobe pulse so long as an adjusted target pulse width obtained in step (d) exceeds a pulse width of the strobe pulse at a time said adjusted target width is obtained, and (f) terminating the strobe pulse when an adjusted target pulse width of step (d) has been equaled or exceeded by a duration of the strobe pulse at the time said adjusted target width is obtained.

10. The method of claim 9 further comprising the step of determining stored look-up table values from previously measured print head element parameters including resistance and temperature.

* * * * *